United States Patent
Jain et al.

(10) Patent No.: US 11,831,467 B1
(45) Date of Patent: Nov. 28, 2023

(54) PROGRAMMABLE MULTICAST PROTOCOL FOR RING-TOPOLOGY BASED ARTIFICIAL INTELLIGENCE SYSTEMS

(71) Applicant: INTERNATIONAL BUSINESS MACHINES CORPORATION, Armonk, NY (US)

(72) Inventors: Shubham Jain, Elmsford, NY (US); Swagath Venkataramani, White Plains, NY (US); Vijayalakshmi Srinivasan, New York City, NY (US); Sunil K Shukla, Scarsdale, NY (US); Martin A Lutz, Peekskill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/663,407

(22) Filed: May 13, 2022

(51) Int. Cl.
| | | |
|---|---|---|
| *H04L 12/773* | (2013.01) | |
| *H04L 12/933* | (2013.01) | |
| *H04L 12/437* | (2006.01) | |
| *H04L 12/42* | (2006.01) | |
| *H04L 12/64* | (2006.01) | |

(52) U.S. Cl.
CPC .......... *H04L 12/42* (2013.01); *H04L 12/6402* (2013.01); *H04L 2012/421* (2013.01); *H04L 2012/6416* (2013.01)

(58) Field of Classification Search
CPC ....... H04L 2012/421; H04L 2012/6416; H04L 12/42; H04L 12/6402
See application file for complete search history.

(56) References Cited

U.S. PATENT DOCUMENTS

| | | | | |
|---|---|---|---|---|
| 7,383,354 | B2 * | 6/2008 | Sultan | H04L 12/462 709/240 |
| 8,582,424 | B2 * | 11/2013 | Kirrmann | H04L 12/437 370/392 |
| 8,842,524 | B2 * | 9/2014 | Dake | H04L 12/437 398/4 |
| 9,922,345 | B2 | 3/2018 | Mikurak | |
| 10,412,012 | B2 | 9/2019 | Bhattacharya et al. | |
| 11,251,245 | B1 * | 2/2022 | Arad | H01L 23/528 |
| | | | (Continued) | |

OTHER PUBLICATIONS

"Feiyang Liu et al., Dynamic Ring-based Multicast with Wavelength Reuse for Optical Network on Chips, 2016, IEEE 10th International Symposium on Embedded Multicore/Many-core Systems-on-Chip (MCSOC), pp. 153-160" (Year: 2016).*

(Continued)

*Primary Examiner* — Rasheed Gidado
(74) *Attorney, Agent, or Firm* — Griffiths & Seaton PLLC

(57) ABSTRACT

Embodiments for providing enhanced multicast data transfer for ring topology based artificial intelligence systems are disclosed. Multicast data is sent to a plurality of disjointed cores in a multicast group according to a first multicast mode, a second multicast mode, or a third multicast mode, where the first multicast mode sends a first half the multicast data on first multicast ring and a second half on a second multicast ring, the second multicast mode sends the multicast data on either the first multicast ring or the second multicast ring, and the third multicast mode replicates the multicast data and sends the multicast data to both the first multicast ring and the second multicast ring.

12 Claims, 8 Drawing Sheets

(56) References Cited

U.S. PATENT DOCUMENTS

2010/0271935 A1* 10/2010 Allasia .................. H04L 45/28
370/222
2020/0259743 A1* 8/2020 Gray .................... H04L 49/106

OTHER PUBLICATIONS

Abad et al., "MRR: Enabling fully adaptive multicast routing for CMP interconnection networks", Conference Paper, 15th International Conference on High Performance Computer Architecture, 2009, HPCA, Mar. 2009, DOI:10.1109/HPCA.2009.4798273 (13 pages).

Guravaiah, Koppala, "Design issues and techniques on data collection in WSNs: A survey", Conference Paper, Bilingual International Conference on Information Technology: Yesterday, Today, and Tomorrow, At: DESIDOC, Aug. 2015 (10 pages).

Graupl et al., "Modeling and evaluating ATM procedures in human-in-the-loop simulations on the example of the hamburg airport operations", Conference Paper, Air Transportation System Conference, Toulouse, France, Jul. 2013, (11 pages).

Kumar Nainar et al., "End-to-end multicast traffic redundancy in networks", IPCOMM000248110D, Oct. 2016, (9 pages).

Vargas et al., "Dynamic multicast gate controller (U.S. Appl. No. 82/016,001)", IPCOMM000247952D, Oct. 2016, (7 pages).

Anonymous, "A system and method for software defined congestion controlled reliable multicast communication in the cloud", IPCOMM000246048D, Apr. 2016 (12 pages).

\* cited by examiner

PROGRAMMABLE MULTICAST PROTOCOL FOR RING-TOPOLOGY BASED ARTIFICIAL INTELLIGENCE SYSTEMS

BACKGROUND

The present invention relates in general to computing systems, and more particularly, to various embodiments for providing programmable multicast protocol for ring-topology based artificial intelligence systems in a computing environment using a computing processor.

SUMMARY

According to an embodiment of the present invention, a method for providing enhanced multicast data transfer for ring topology based artificial intelligence systems in a computing environment, by one or more processors, is depicted. Multicast data is sent to a plurality of disjointed cores in a multicast group according to a first multicast mode, a second multicast mode, or a third multicast mode, where the first multicast mode sends a first half the multicast data on first multicast ring and a second half on a second multicast ring, the second multicast mode sends the multicast data on either the first multicast ring or the second multicast ring, and the third multicast mode replicates the multicast data and sends the multicast data to both the first multicast ring and the second multicast ring.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments for automated evaluation of robustness of machine learning models under adaptive whitebox adversarial operation are provided.

DETAILED DESCRIPTION OF THE DRAWINGS

Figure 1:
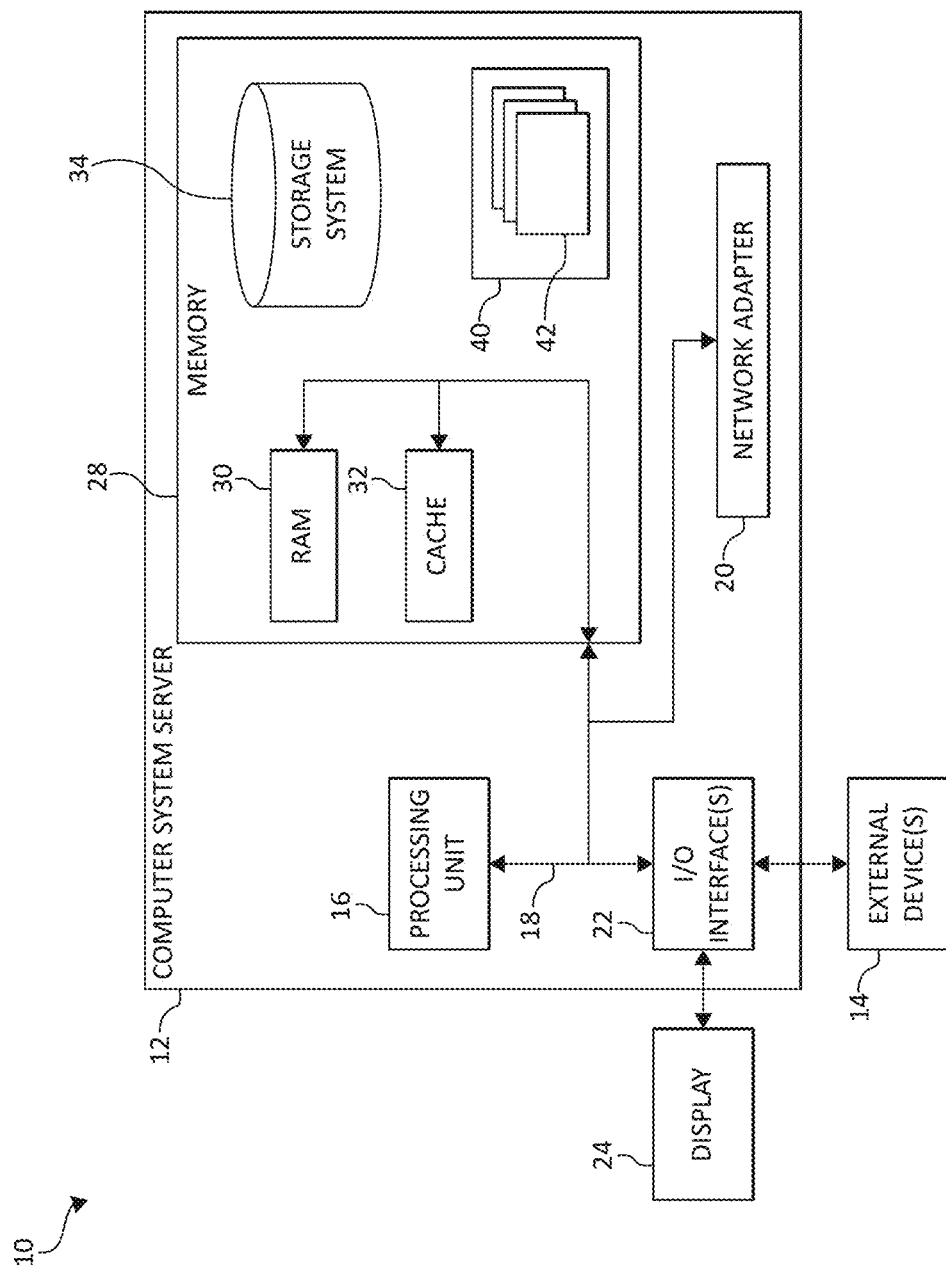
FIG. 1 is a block diagram depicting an exemplary cloud computing node according to an embodiment of the present invention.

In general, data may be transferred as unicast, broadcast or multicast. Unicast is a one-to-one transfer, to wit, from a single sender to a single receiver. For example, all typical Internet application programs are unicast. Broadcast is a one-to-many transmission in a subnetwork. That is, broadcasting is a method of sending the same data to all possible destinations. Unicasting is a method of sending data point-to-point such as, for example, from a single sender to a single receiver. Broadcasting is a method of sending the same data to all possible destinations.

Another multi-destination distribution method, multicasting, sends the same data only to interested destinations called receivers by using special address assignments. Internet Protocol (IP) multicast is the process of multicasting IP packets to several receivers in a single transmission of the IP packet. IP multicast is a technique used to help conserve bandwidth in the data center and reduce the load on servers. Any network traffic directed at that IP address will reach all devices that share the IP address, instead of just one device.

Computers and other devices connected to a network use an internet group management protocol ("IGMP") protocol when those computers, devices, or applications want to join a multicast group. A router that supports IGMP listens to IGMP transmissions from each of the computers, devices, or applications in order to figure out which of the computers, devices, or applications belong to which multicast groups. IGMP uses IP addresses that are set aside for multicasting. Each multicast group shares one of these IP addresses. When a router receives a series of packets directed at the shared IP address, the router will duplicate those packets, sending copies to all members of the multicast group.

In physical network switches and routers that support multicast, the packet may be replaced, and the membership list may be maintained for the members downstream group members. IP hosts use IGMP to report their multicast group memberships to any immediately neighboring multicast routing devices. Multicast routing devices use IGMP to learn, for each of their attached physical networks, which groups have members. Multicast may be used to exploit data sharing behavior amongst multiple consumers, and have a single producer (e.g., owner) of data simultaneously deliver the data to all sharers within a single group. Thus, multicasting is when a group of devices all receive the same messages or packets. Multicasting works by sharing an Internet Protocol (IP) address between multiple devices.

Moreover, advances in high-performance computing systems and semiconductor technology result in the continuous improvement and development of Chip Multi-Processors (CMPs) (e.g., processing cores or "cores"). With the rapid increase of network traffic among these high-speed cores, the high bandwidth and energy efficient communication architecture becomes especially important. Multicast communication, in which packets from one source core need to be addressed simultaneously to multiple destinations (e.g., destination core), exists in CMPs due to the demand on cooperative computing and cache coherence.

Thus, the present invention provides providing enhanced multicast data transfer for ring topology based artificial intelligence systems in a computing environment, by one or more processors, is depicted. Multicast data is sent to a plurality of disjointed cores in a multicast group according to a first multicast mode, a second multicast mode, or a third multicast mode, where the first multicast mode sends a first half the multicast data on first multicast ring and a second half on a second multicast ring, the second multicast mode sends the multicast data on either the first multicast ring or the second multicast ring, and the third multicast mode replicates the multicast data and sends the multicast data to both the first multicast ring and the second multicast ring.

In other implementations, one or more consumers may identify a producer to be part of a multi-cast group. The producer may send the data to all a consumers using multi-cast protocol. In this way, the present invention provides maximum flexibility for multicasting by requiring each consumer (e.g., receiver/core) to individually request the multicast data transfer. The producer (e.g., sends of the multicast data and can be a core in the multi-cast group) enforces synchronization by waiting until all the participating consumers have made the multicast data requests, and then delivers the multicast data in a single group communication.

In general, as used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a "optimized" (e.g., best) solution or result but may refer to a solution or result that "is good enough" for a particular application, for example. In some implementations, an objective is to suggest a "best" combination of operations and/or machine learning models/machine learning pipelines, but there may be a variety of factors that may result in alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
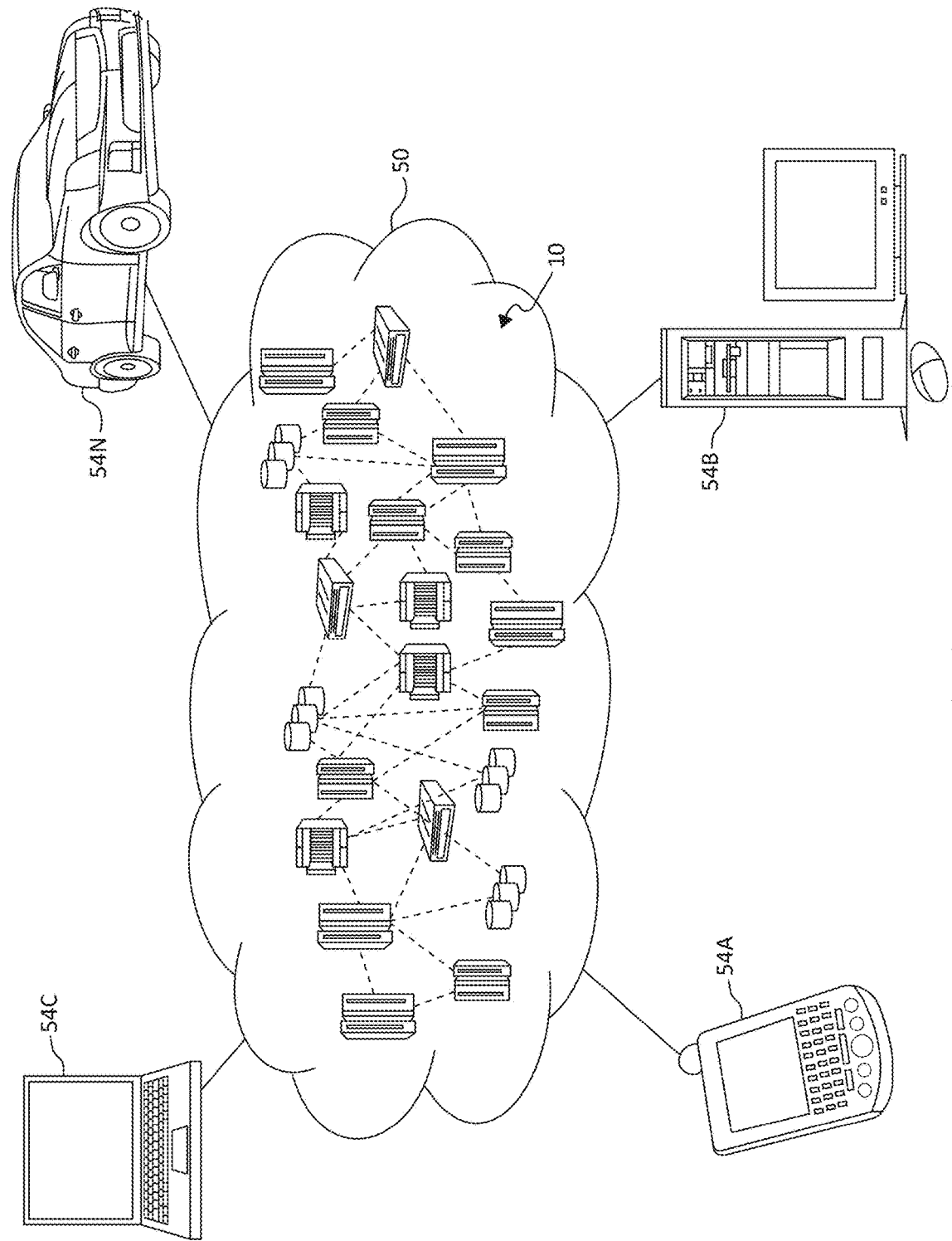
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
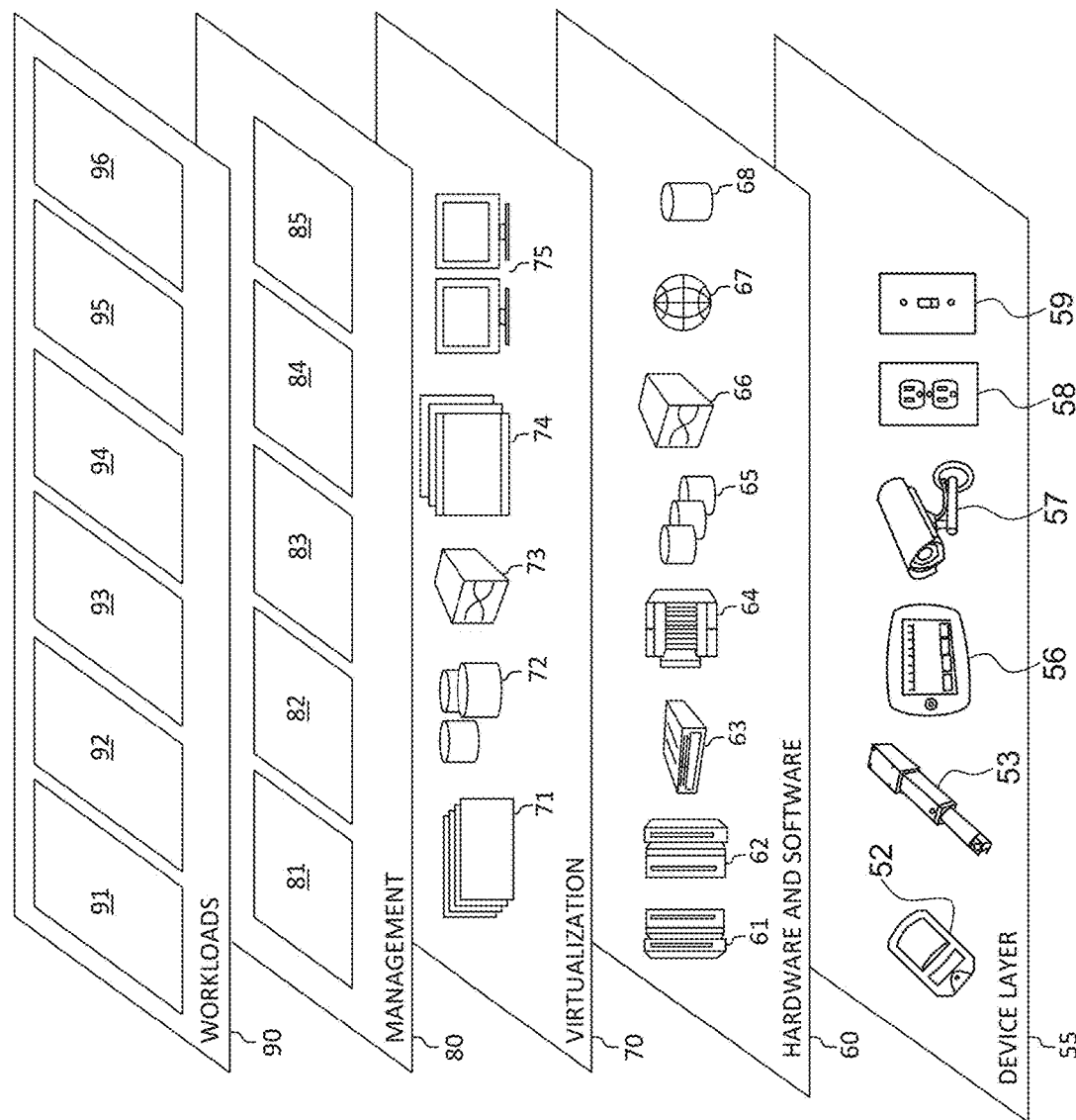
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing programmable multicast protocol for ring-topology based artificial intelligence systems in a computing environment (e.g., in a neural network architecture). In addition, workloads and functions 96 for providing programmable multicast protocol for ring-topology based artificial intelligence systems in a computing environment may include such operations as analytics, deep learning, and as will be further described, user and device management functions. One of ordinary skill in the art will appreciate that the workloads and functions 96 for providing memory access operations for large graph analytics in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
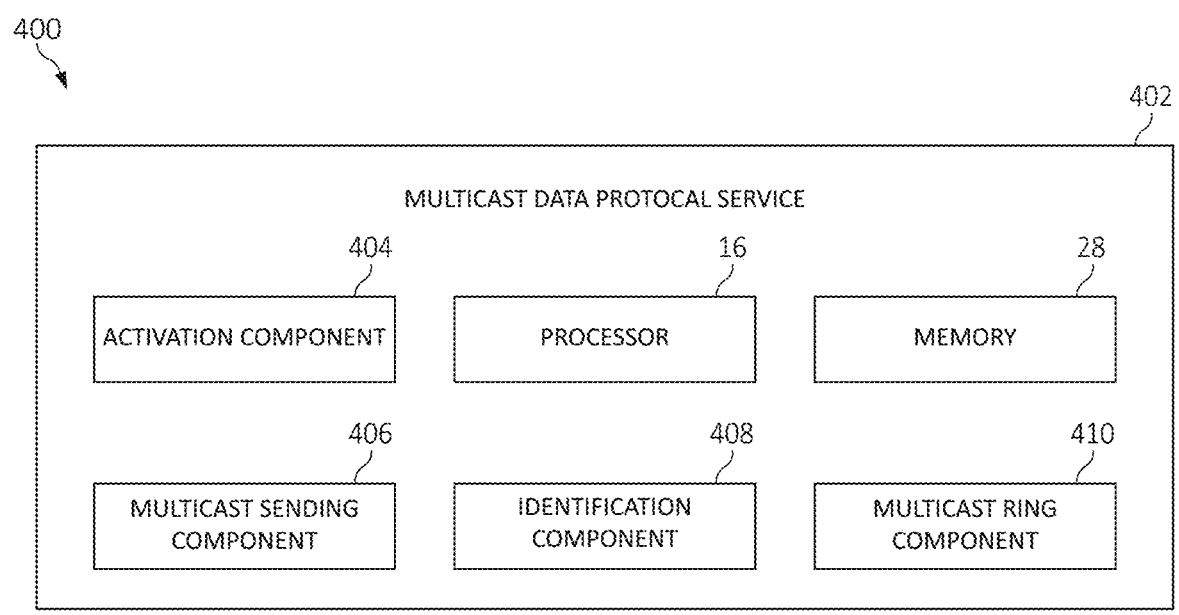
FIG. 4 is an additional block diagram depicting an exemplary functional relationship between various aspects of the present invention.

Turning now to FIG. 4, is a block diagram depicting exemplary functional components of system 400 for providing programmable multicast protocol for ring-topology based artificial intelligence systems in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

In one aspect, the system 400 may provide virtualized computing services (i.e., virtualized computing, virtualized storage, virtualized networking, etc.). More specifically, the system 400 may provide virtualized computing, virtualized storage, virtualized networking and other virtualized services that are executing on a hardware substrate.

In some implementations, computer system/server 12 of FIG. 1 may be included in FIG. 4 and may be connected to other computing nodes over a distributed computing network, where additional data collection, processing, analytics, and other functionality may be realized. The components of computer system/server 12 may include, but are not limited to, one or more processors or processing units 16 ("processor") and/or a system memory 28.

The computer system/server 12 of FIG. 1, may include a multicast data protocol service 402, along with other related components in order to provide single-producer-multiple consumers synchronization and multicast data transfer. The multicast data protocol service 402 may include an activation component 404, a multicast sending component 406, an identification component 408, and a multicast ring component 410. In one aspect, the multicast data protocol service 402 may be associated with one or more producers and the receivers may be associated with one or more consumers of the multicast data.

In some implementations, the multicast data protocol service 402, using the activation component 404, the multicast sending component 406, the identification component 408, the multicast ring component 410, or a combination thereof, may send multicast data to a plurality of disjointed cores in a multicast group according to a first multicast mode, a second multicast mode, or a third multicast mode, where the first multicast mode sends a first half the multicast data on first multicast ring and a second half on a second multicast ring, the second multicast mode sends the multicast data on either the first multicast ring or the second multicast ring, and the third multicast mode replicates the multicast data and sends the multicast data to both the first multicast ring and the second multicast ring.

In some implementations, the multicast data protocol service 402, using the activation component 404, the multicast sending component 406, the identification component 408, the multicast ring component 410, or a combination thereof, may activate the first multicast mode and sending the first half of the multicast data on a clockwise multicast ring and the second half of the multicast data on a counter-clockwise multicast ring. In some implementations, the multicast data protocol service 402, using the activation component 404, the multicast sending component 406, the identification component 408, the multicast ring component 410, or a combination thereof, may restrict the multicast data from being replicated during the first multicast mode.

In some implementations, the multicast data protocol service 402, using the activation component 404, the multicast sending component 406, the identification component 408, the multicast ring component 410, or a combination thereof, may activate the second multicast mode and sending the multicast data on either a clockwise multicast ring or a counter-clockwise multicast ring.

In some implementations, the multicast data protocol service 402, using the activation component 404, the multicast sending component 406, the identification component 408, the multicast ring component 410, or a combination thereof, may a) replicate the multicast data; and b) activate the third multicast mode and sending the multicast data on both a clockwise multicast ring and a counter-clockwise multicast ring.

In other implementations, the multicast data protocol service 402, using the activation component 404, the multicast sending component 406, the identification component 408, the multicast ring component 410, or a combination thereof, may identify a multicast polarity and an identifier of one or more requesting cores for sending the sending multicast data according to the first multicast mode, the second multicast mode, or the third multicast mode.

In other implementations, the multicast data protocol service 402, using the activation component 404, the multicast sending component 406, the identification component 408, the multicast ring component 410, or a combination thereof, may use one or more multicast ring inter-connections of the plurality of disjointed cores for sending the multicast data according to the first multicast mode, the second multicast mode, or the third multicast mode, wherein the one or more multicast ring inter-connections enable the multicast data to reach the plurality of disjointed cores without traversing an entire multicast ring.

In other implementations, the multicast data protocol service 402, using the activation component 404, the multicast sending component 406, the identification component 408, the multicast ring component 410, or a combination thereof, may selectively activate the first multicast mode, the second multicast mode, or the third multicast mode. In other implementations, the multicast data protocol service 402, using the activation component 404, the multicast sending component 406, the identification component 408, the multicast ring component 410, or a combination thereof, may select between the first multicast mode, the second multicast mode, or the third multicast mode using a software instruction executed in the one or more processors.

In other implementations, the multicast data protocol service 402, using the activation component 404, the multicast sending component 406, the identification component 408, the multicast ring component 410, or a combination thereof, may switch between the first multicast mode or the second and third multicast mode, wherein a hardware logic is provided to select between the second multicast mode and the third multicast mode using a software instruction executed in the one or more processors, wherein, the logic utilizes an identifier of one or more requesting cores and distance to select between the second multicast mode and the third multicast mode. A processor core of at least one of the one or more processors executing the software instruction to determine the multicast mode is a sender core that sends data to one or more requesting cores.

In other implementations, the multicast data protocol service 402, using the activation component 404, the multicast sending component 406, the identification component 408, the multicast ring component 410, or a combination thereof, may identify a multicast polarity and an identifier of one or more requesting cores for sending the sending multicast data according to the first multicast mode, the second multicast mode, or the third multicast mode.

In other implementations, the multicast data protocol service 402, using the activation component 404, the multicast sending component 406, the identification component 408, the multicast ring component 410, or a combination thereof, may use one or more multicast ring inter-connections of the plurality of disjointed cores for sending the multicast data according to the first multicast mode, the second multicast mode, or the third multicast mode, wherein the one or more multicast ring inter-connections enable the multicast data to reach the plurality of disjointed cores without traversing an entire multicast ring.

Figure 5:
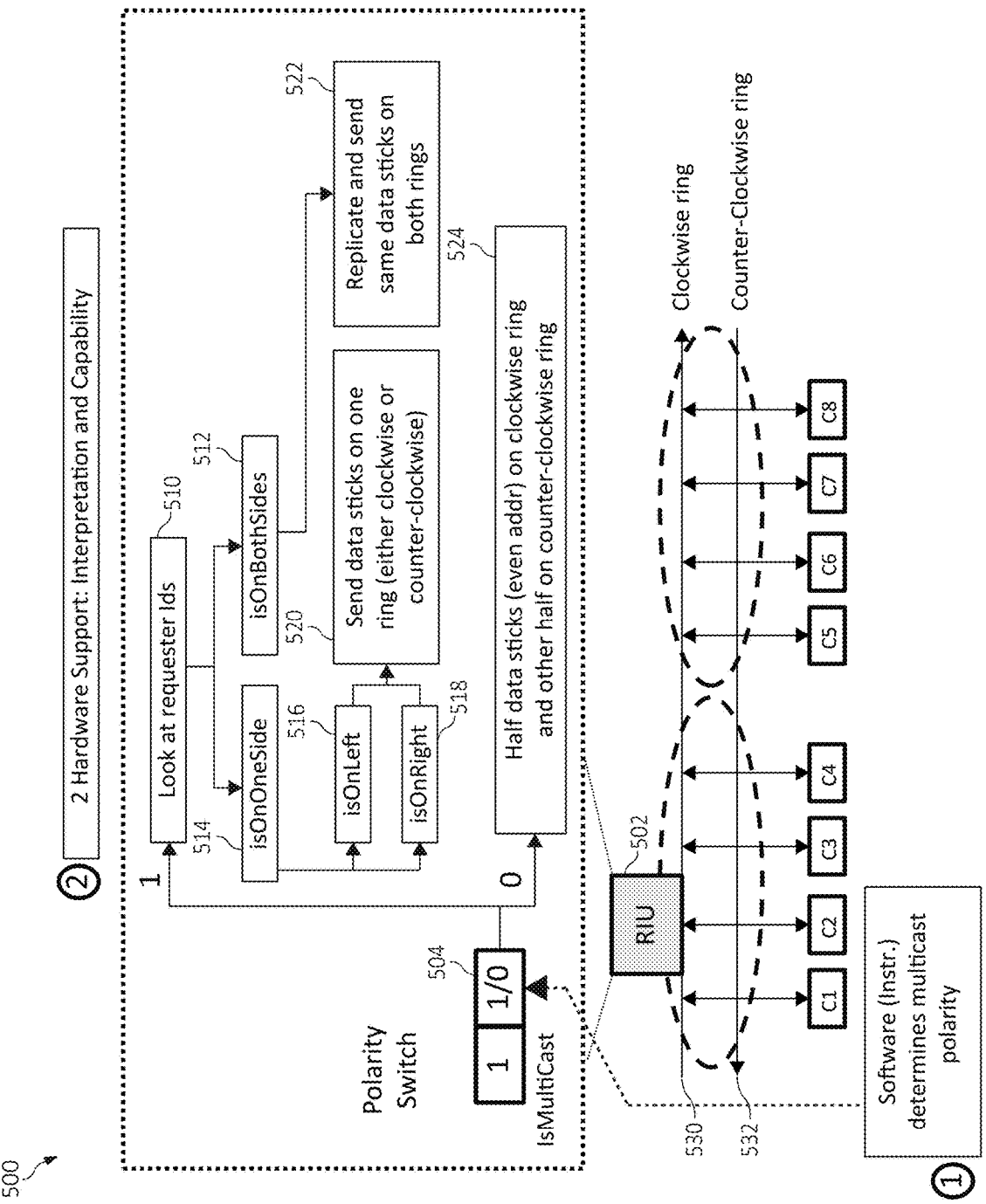
FIG. 5 depicts a block flow diagram depicting an exemplary operation for providing programmable multicast protocol for ring-topology based artificial intelligence systems in a computing environment according to an embodiment of the present invention.

For further explanation, FIG. 5 depicts a block flow diagram 500 depicting an exemplary operation for providing programmable multicast protocol for ring-topology based artificial intelligence systems in a computing environment according to an embodiment of the present invention. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for sake of brevity.

As depicted in FIG. 5, a network 500 such as, for example, an interconnection network of multiple disjointed groups of cores such as, for example, cores C1-C4 and C5, C6, C7, C8. Data shuffles happens between consecutive convolutions/matmuls to re-layout data among the cores such as, for example, cores C1-C4 and C5, C6, C7, C8 (e.g., among the LX-spads of the cores), and observed traffic patterns are depicted wherein the multi-cast communication, within multiple disjoint group of core. Example: C2 multi-casts to C1, C3, C4. C6 multi-casts to C5, C6, C7.

A current multi-cast protocol may send half (½) the data in clockwise ring 530 and the other half in counter-clockwise ring 532 (e.g., a first multicast mode). That is, the data may be sent half in clockwise ring 530 and the other half in counter-clockwise ring 532.

For example, data from C2 and C6 may travel through the whole ring (e.g., the clockwise ring 530 and/or counter-clockwise ring 532) to reach their consumers. In some implementations, the present invention may exploit ring inter-connection to support concurrent multi-cast communication within multiple disjoint group of cores (e.g., C1-C4 and C5, C6, C7, C8) without requiring for the data to travel through the full ring (e.g., the clockwise ring 530 and/or counter-clockwise ring 532). In some implementations, multiple segments in the ring (e.g., the clockwise ring 530 and/or counter-clockwise ring 532) via intra-segment communication will not use the whole ring (e.g., the clockwise ring 530 and/or counter-clockwise ring 532) causing the ring bandwidth to increase.

In some implementations, the present invention may inject similar/same data in both clockwise ring 520 and counter-clockwise ring 530 to cater to destinations to the left and right of the producer core. The left and right neighbors (e.g., left and right neighbor cores) may be determined by shortest path from producer. When all the destinations are on one side (left or right) of the producer core, then use only one ring to send all the data. The computing application/software determines which multicast modes of multi-cast to use based on the overall traffic pattern.

Moreover, a ring interface unit ("MU") 502 may support the various multicast modes for core-to-core multicast instruction that may include an extra bit to indicate first multicast mode, the second multicast mode, or the third multicast mode of multi-cast. In one aspect, an L3SU generates a 1-bit (see FIG. 5) or 2-bit (see FIG. 6) signal based on which the multicast mode is determined. L3SU is a programmable unit inside a core that is responsible for sending data to the neighboring cores. For instance, if a core needs to send data (i.e., it is producer core) then it achieves this utilizing it's L3 SU unit. Further, a software instruction executed inside L3SU determines the multicast flavor, i.e., it decides between mode 0, 1, and 2.

The L3SU may send data to neighboring cores in the first multicast mode, the second multicast mode, or the third multicast mode of multi-cast. When meta-data for a multi-cast response is posted to the RIU 502, it will additionally include the flavor of multi-cast to be used. The requestors of the multi-cast data (i.e., matching instructions of the consumers) need not have any changes.

To further illustrate, in a first embodiment, consider the following for providing programmable multicast protocol for ring-topology based artificial intelligence systems for the multiple disjoint group of cores (e.g., C1-C4 and C5, C6, C7, C8) associated with the RIU 502.

In step (1), a computing application (e.g., software instruction) may determine a multicast polarity via a polarity switch 504 (e.g., one or zero) to determine a first multicast mode, a second multicast mode, or a third multicast mode. In some implementations, for example, the first multicast mode sends a first half the multicast data on first multicast ring and a second half on a second multicast ring, the second multicast mode sends the multicast data on either the first multicast ring or the second multicast ring, and the third multicast mode replicates the multicast data and sends the multicast data to both the first multicast ring and the second multicast ring.

Figure 6:
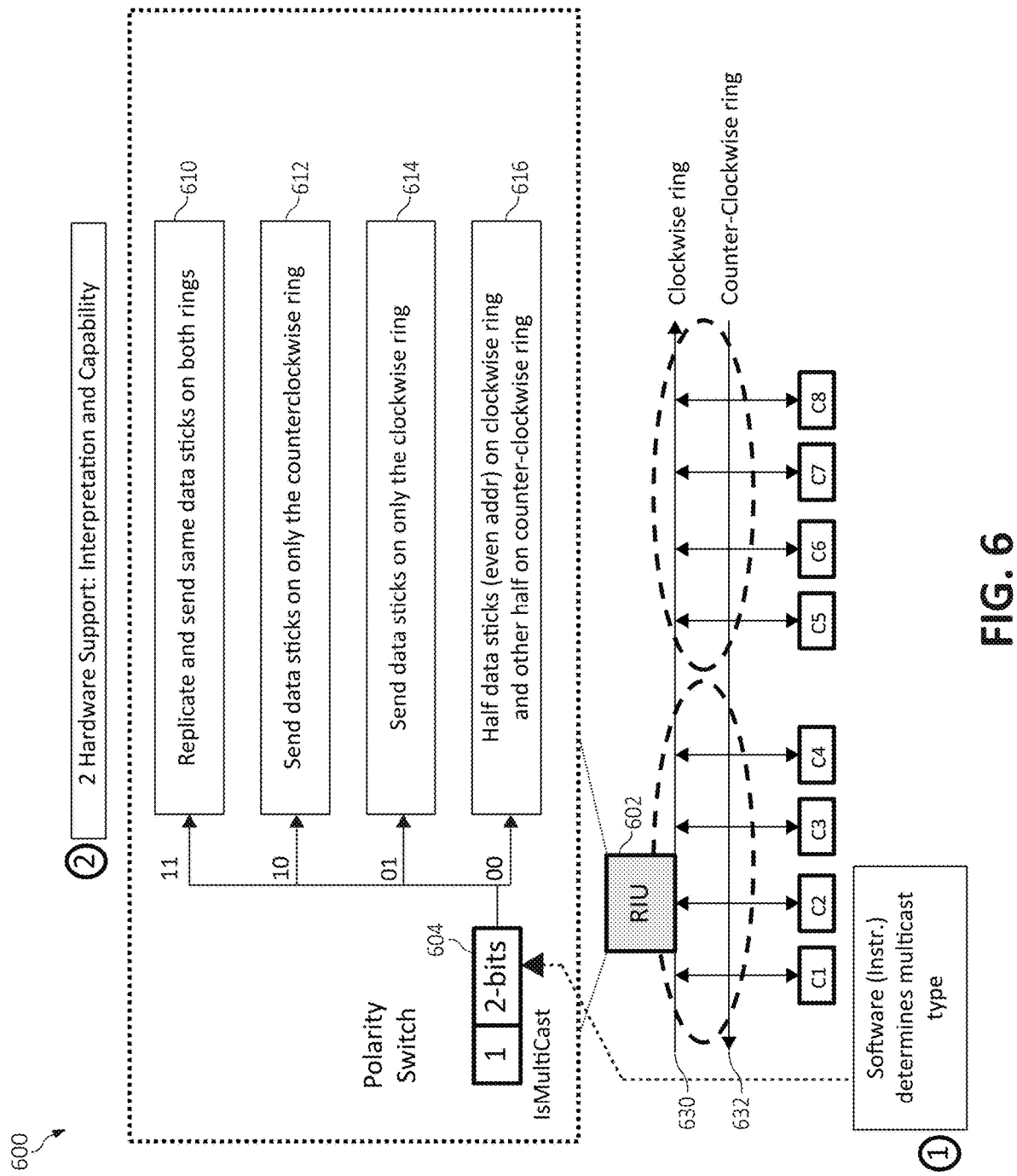
FIG. 6 depicts a block flow diagram depicting an additional exemplary operation for providing programmable multicast protocol for ring-topology based artificial intelligence systems in a computing environment according to an embodiment of the present invention.

In step (2), based on the polarity switch value set in step (1), the RIU 502 hardware sends the data on either or both rings. If polarity is set to "0", at block 504, the data is sent as depicted in block 514, i.e., half the data is sent on a clockwise ring and other half is sent on counter-clockwise ring. If polarity is set to 1, at block 504, then an operation may be executed for identifying and/or looking at a requesting parties identifier ("IDS), as in block 510, and determine the IDS is on one side (e.g., isOnOneSide), as in block 514 or on both sides, as in block 512. It should be noted that step (2) of FIG. 5 and FIG. 6 provides hardware support for interpretation and capability.)

If the IDS is on only one side, an operation is executed to determine if the IDS is on the left, as in block 516, or on the right, as in block 518. In block 520, data sticks may be sent on a ring such as, for example, either the clockwise ring 530 and/or counter-clockwise ring 532. From data 512, data sticks may be replicated and sent on both the clockwise ring 530 and counter-clockwise ring 532.

In association with steps (1), an operation may be executed for identifying and/or looking at a requesting parties (e.g., consumers that are cores receiving/consuming the data) identifier ("IDS), as in block 510, and determine the IDS is on one side (e.g., isOnOneSide), as in block 514 or on both sides, as in block 512.* If the IDS is on only one side, is executed to determine if the IDS is on the left, as in block 516, or on the right, as in block 518. In block 520, data sticks may be sent on a ring such as, for example, either the clockwise ring 530 and/or counter-clockwise ring 532.

From block 512, data sticks may be replicated and sent on both the clockwise ring 530 and counter-clockwise ring 532. In block 524, half of the data sticks (even addr) may be sent on clockwise ring 530 and/or counter-clockwise ring 532.

FIG. 6 depicts a block flow diagram 600 depicting an additional exemplary operation for providing programmable multicast protocol for ring-topology based artificial intelligence systems in a computing environment according to an embodiment of the present invention. In one aspect, one or more of the components, modules, services, applications, and/or functions described in FIGS. 1-5 may be used in FIG. 6. Repetitive description of like elements, components, modules, services, applications, and/or functions employed in other embodiments described herein is omitted for sake of brevity.

To further illustrate, in a second embodiment, consider the following for providing programmable multicast protocol for ring-topology based artificial intelligence systems for the multiple disjoint group of cores (e.g., C1-C4 and C5, C6, C7, C8) associated with a ring interface unit ("MU") 602 using the clockwise ring 630 and/or counter-clockwise ring 632

In step (1), a computing application (e.g., software instruction) may determine a multicast polarity via a polarity switch 604 (e.g., one or zero) to determine a first multicast mode, a second multicast mode, or an nth multicast mode (e.g., a fourth multicast mode). It should be noted that the polarity switch 604 is not just 0 or 1, but rather, the polarity switch 604 may be one of a variety of values such as, for example, 0, 1, 2, and 3. That is, the polarity switch 604 is a 2-bit entity. Also, it should be noted that the difference between FIG. 5 and FIG. 6 is that the software instruction explicitly determines the action described in 512, 516, and 518. In FIG. 5, operations of 512, 516, and 518 are performed by the RIU 502 hardware using position-based (i.e., left or right) algorithm depicted in FIG. 5.

In some implementations, for example, the first multicast mode sends a first half the multicast data on first multicast ring and a second half on a second multicast ring (e.g., half on both the clockwise ring 630 or counter-clockwise ring 632).

The second multicast mode sends the multicast data on the first multicast ring (e.g., counter-clockwise ring 632), the third multicast mode sends the multicast data on the second multicast ring (e.g., clockwise ring 630), and the third multicast mode replicates the multicast data and sends the multicast data to both the first multicast ring and the second multicast ring (e.g., the clockwise ring 630 and the counter-clockwise ring 632).

In association with steps (1), an operation may be executed for replicating and sending similar (e.g., same) data sticks on both rings (e.g., the clockwise ring 630 and counter-clockwise ring 632) (if the polarity bits are 11), as in block 610. In block 612, the data sticks may be sent on only a first ring such as, for example, only the counter-clockwise ring 632) (if the polarity bits are 10). In block 614, the data sticks may be sent on only one of the second ring such as, for example, only the counter-clockwise ring 632) (if the polarity bits are 01). In block 616, half of the data sticks (even addr) may be sent on the first ring and the remaining of half of the data sticks the second ring such as, for example, only the counter-clockwise ring 632) (if the polarity bits are 00).

Figure 7:
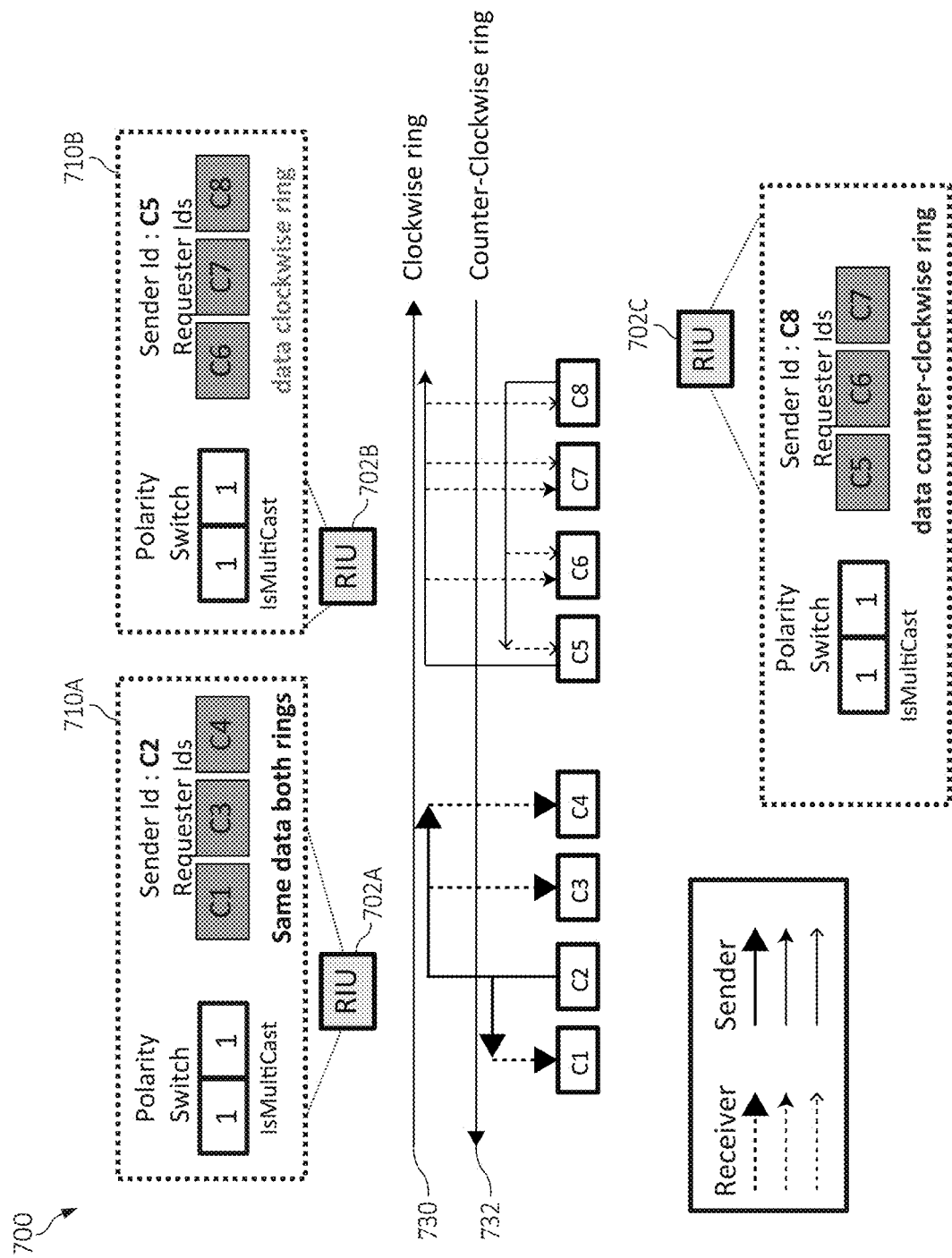
FIG. 7 depicts a block flow diagram depicting an exemplary protocols for programmable multicast protocol for ring-topology based artificial intelligence systems in a computing environment according to an embodiment of the present invention.

FIG. 7 depicts a block flow diagram depicting an exemplary protocols for programmable multicast protocol for ring-topology based artificial intelligence systems in a computing environment according to an embodiment of the present invention.

In one aspect, one or more of the components, modules, services, applications, and/or functions described in FIGS. 1-6 may be used in FIG. 7. Repetitive description of like elements, components, modules, services, applications, and/or functions employed in other embodiments described herein is omitted for sake of brevity.

To further illustrate, using the first embodiment of FIG. 7, consider the following for providing programmable multicast protocol for ring-topology based artificial intelligence systems for the multiple disjoint group of cores (e.g., C1-C4 and C5, C6, C7, C8) associated with two RUIs 702A, 702B using the clockwise ring 730 and/or counter-clockwise ring 732.

As depicted in blocks 710A, the polarity switch is used to identify the multicast polarity and identify one or more requesting cores' ID (e.g., C1, C3, and C4) for sending the multicast data according to the first multicast mode, the second multicast mode, or the third multicast mode. As depicted, C2 may send the multicast data to C1, C3, and C4 (e., cores that are included with disjointed cores in the multicast group) according to the first multicast mode, the second multicast mode, or the third multicast mode.

As depicted, the multicast data is sent from the C2 to C1, C3, and C4 using both the clockwise ring 730 and the counter-clockwise ring 732 via the third multicast mode replicates the multicast data. As depicted, each of the cores (e.g., C1, C3, and C4) have various multicast ring interconnections that enables the multicast data to reach the plurality of disjointed cores (e.g., C1, C3, and C4) without traversing an entire multicast ring (e.g., the clockwise ring 730 and the counter-clockwise ring 732).

In contrast, in block 710B, the polarity switch is used to identify the multicast polarity and identify one or more requesting cores' ID (e.g., C6, C7, and C8) for sending the multicast data according to the first multicast mode, the second multicast mode, or the third multicast mode. As depicted, C5 may send the multicast data to C6, C7, and C8 (e.g., cores that are included with disjointed cores in the multicast group) according to the first multicast mode, the second multicast mode, or the third multicast mode.

As depicted, the multicast data is sent from C5 to C6, C7, and C8 using only the clockwise ring 730 via the second multicast mode where C5 sends the multicast data on either the first multicast ring or the second multicast ring, which in this scenario is the clockwise ring 730. As depicted, each of the cores (e.g., C6, C7, and C8) have various multicast ring inter-connections that enables the multicast data to reach the plurality of disjointed cores (e.g., C6, C7, and C8) without traversing an entire multicast ring (e.g., the clockwise ring 730).

Turning now to block 710C, the polarity switch is used to identify the multicast polarity and identify one or more requesting cores' ID (e.g., C5, C6, and C7) for sending the multicast data according to the first multicast mode, the second multicast mode, or the third multicast mode. As depicted, C8 may send the multicast data to C5, C6, and C7 (e.g., cores that are included with disjointed cores in the multicast group) according to the first multicast mode, the second multicast mode, or the third multicast mode.

As depicted, the multicast data is sent from C8 to C5, C6, and C7 using only the counter-clockwise ring 732 where C8 sends the multicast data on either the first multicast ring or the second multicast ring, which in this scenario is the counter-clockwise ring 732. As depicted, each of the cores (e.g., C5, C6, and C7) have various multicast ring inter-connections that enables the multicast data to reach the plurality of disjointed cores (e.g., C5, C6, and C7) without traversing an entire multicast ring (e.g., the counter-clockwise ring 732).

Figure 8:
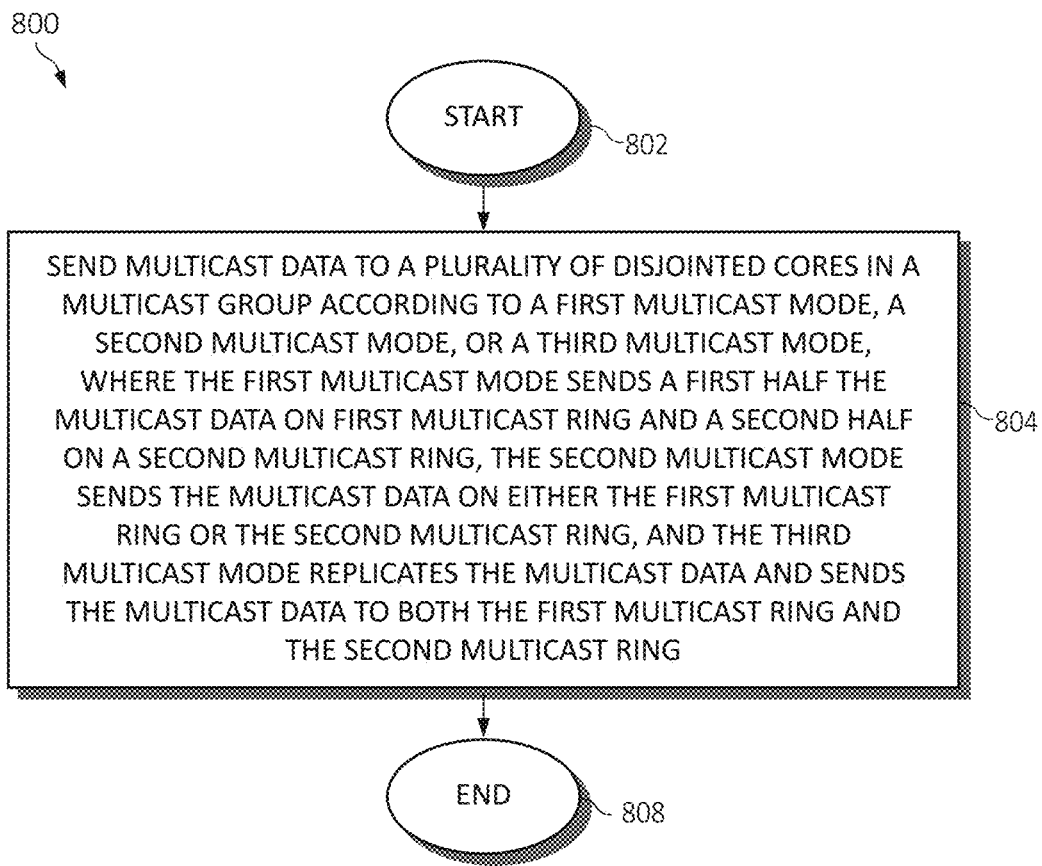
FIG. 8 is a flowchart diagram depicting an exemplary method for providing programmable multicast protocol for ring-topology based artificial intelligence systems in a computing environment, by a processor, in which aspects of the present invention may be realized.

Turning now to FIG. 8, a method 800 for providing programmable multicast protocol for ring-topology based artificial intelligence systems in a computing environment using a processor is depicted, in which various aspects of the illustrated embodiments may be implemented. The functionality 800 may be implemented as a method (e.g., a computer-implemented method) executed as instructions on a machine, where the instructions are included on at least one computer readable medium or one non-transitory machine-readable storage medium. The functionality 800 may start in block 802.

Multicast data is sent to a plurality of disjointed cores in a multicast group according to a first multicast mode, a second multicast mode, or a third multicast mode, where the first multicast mode sends a first half the multicast data on first multicast ring and a second half on a second multicast ring, the second multicast mode sends the multicast data on either the first multicast ring or the second multicast ring, and the third multicast mode replicates the multicast data and sends the multicast data to both the first multicast ring and the second multicast ring, as in block 804. The functionality 800 may end, as in block 806.

In one aspect, in conjunction with and/or as part of at least one blocks of FIG. 8, the operations of method 800 may include each of the following. The operations of 800 may identify and/or activate the first multicast mode and sending the first half of the multicast data on a clockwise multicast ring and the second half of the multicast data on a counter-clockwise multicast ring and restrict the multicast data from being replicated during the first multicast mode.

The operations of 800 may identify and/or activate the second multicast mode and sending the multicast data on either a clockwise multicast ring or a counter-clockwise multicast ring. The operations of 800 may replicate the multicast data, and activate the third multicast mode and sending the multicast data on both a clockwise multicast ring and a counter-clockwise multicast ring.

The operations of 800 may identify a multicast polarity and an identifier of one or more requesting cores for sending the sending multicast data according to the first multicast mode, the second multicast mode, or the third multicast mode. The operations of 800 may use one or more multicast ring inter-connections of the plurality of disjointed cores for sending the multicast data according to the first multicast mode, the second multicast mode, or the third multicast mode, wherein the one or more multicast ring inter-connections enable the multicast data to reach the plurality of disjointed cores without traversing an entire multicast ring.

The operations of 800 may selectively activate the first multicast mode, the second multicast mode, or the third multicast mode. The operations of 800 may select between the first multicast mode, the second multicast mode, or the third multicast mode using a software instruction executed in the one or more processors.

The operations of 800 may switch between the first multicast mode or the second and third multicast mode, wherein a hardware logic is provided to select between the second multicast mode and the third multicast mode using a software instruction executed in the one or more processors, wherein, the logic utilizes an identifier of one or more requesting cores and distance to select between the second multicast mode and the third multicast mode. A processor core of at least one of the one or more processors executing the software instruction to determine the multicast mode is a sender core that sends data to one or more requesting cores.

The operations of 800 may identify a multicast polarity and an identifier of one or more requesting cores for sending the sending multicast data according to the first multicast mode, the second multicast mode, or the third multicast mode.

The operations of 800 may use one or more multicast ring inter-connections of the plurality of disjointed cores for sending the multicast data according to the first multicast mode, the second multicast mode, or the third multicast mode, wherein the one or more multicast ring inter-connections enable the multicast data to reach the plurality of disjointed cores without traversing an entire multicast ring.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing enhanced multicast data transfer for ring topology based artificial intelligence systems in a computing environment by one or more processors comprising:
   sending multicast data to a plurality of disjointed cores in a multicast group according to a first multicast mode, a second multicast mode, or a third multicast mode, wherein the first multicast mode sends a first half the multicast data on first multicast ring and a second half on a second multicast ring, the second multicast mode sends the multicast data on either the first multicast ring or the second multicast ring, and the third multicast mode replicates the multicast data and sends the multicast data to both the first multicast ring and the second multicast ring; and
   selecting between the first multicast mode or the second and third multicast mode, wherein a hardware logic is provided to select between the second multicast mode and the third multicast mode using a software instruction executed in the one or more processors, wherein, the logic utilizes an identifier of one or more requesting cores and distance to select between the second multicast mode and the third multicast mode.

2. The method of claim 1, wherein a processor core of at least one of the one or more processors executing the software instruction to determine the multicast mode is a sender core that sends data to one or more requesting cores.

3. The method of claim 1, further including identifying a multicast polarity and an identifier of one or more requesting cores for sending the sending multicast data according to the first multicast mode, the second multicast mode, or the third multicast mode.

4. The method of claim 1, further including using one or more multicast ring inter-connections of the plurality of disjointed cores for sending the multicast data according to the first multicast mode, the second multicast mode, or the third multicast mode, wherein the one or more multicast ring inter-connections enable the multicast data to reach the plurality of disjointed cores without traversing an entire multicast ring.

5. A system for providing enhanced multicast data transfer for ring topology based artificial intelligence systems in a computing environment, comprising:
   one or more computers with executable instructions that when executed cause the system to:
      send multicast data to a plurality of disjointed cores in a multicast group according to a first multicast mode, a second multicast mode, or a third multicast mode, wherein the first multicast mode sends a first half the multicast data on first multicast ring and a second half on a second multicast ring, the second multicast mode sends the multicast data on either the first multicast ring or the second multicast ring, and the third multicast mode replicates the multicast data and sends the multicast data to both the first multicast ring and the second multicast ring; and
      select between the first multicast mode or the second and third multicast mode, wherein a hardware logic is provided to select between the second multicast mode and the third multicast mode using a software instruction executed in the one or more processors, wherein, the logic utilizes an identifier of one or more requesting cores and distance to select between the second multicast mode and the third multicast mode.

6. The system of claim 5, wherein a processor core of at least one of the one or more processors executing the software instruction to determine the multicast mode is a sender core that sends data to one or more requesting cores.

7. The system of claim 5, wherein the executable instructions when executed cause the system to identify a multicast polarity and an identifier of one or more requesting cores for sending the sending multicast data according to the first multicast mode, the second multicast mode, or the third multicast mode.

8. The system of claim 5, wherein the executable instructions when executed cause the system to use one or more multicast ring inter-connections of the plurality of disjointed cores for sending the multicast data according to the first multicast mode, the second multicast mode, or the third multicast mode, wherein the one or more multicast ring inter-connections enable the multicast data to reach the plurality of disjointed cores without traversing an entire multicast ring.

9. A computer program product for providing enhanced multicast data transfer for ring topology based artificial intelligence systems in a computing environment, the computer program product comprising:
one or more non-transitory computer readable storage media, and program instructions collectively stored on the one or more non-transitory computer readable storage media and executed by a processor, the program instruction comprising:
program instructions to send multicast data to a plurality of disjointed cores in a multicast group according to a first multicast mode, a second multicast mode, or a third multicast mode, wherein the first multicast mode sends a first half the multicast data on first multicast ring and a second half on a second multicast ring, the second multicast mode sends the multicast data on either the first multicast ring or the second multicast ring, and the third multicast mode replicates the multicast data and sends the multicast data to both the first multicast ring and the second multicast ring; and
program instructions to select between the first multicast mode or the second and third multicast mode, wherein a hardware logic is provided to select between the second multicast mode and the third multicast mode using a software instruction executed in the one or more processors, wherein, the logic utilizes an identifier of one or more requesting cores and distance to select between the second multicast mode and the third multicast mode.

10. The computer program product of claim 9, wherein a processor core of at least one of the one or more processors executing the software instruction to determine the multicast mode is a sender core that sends data to one or more requesting cores.

11. The computer program product of claim 9, further including program instructions to identify a multicast polarity and an identifier of one or more requesting cores for sending the sending multicast data according to the first multicast mode, the second multicast mode, or the third multicast mode.

12. The computer program product of claim 9, further including program instructions to use one or more multicast ring inter-connections of the plurality of disjointed cores for sending the multicast data according to the first multicast mode, the second multicast mode, or the third multicast mode, wherein the one or more multicast ring inter-connections enable the multicast data to reach the plurality of disjointed cores without traversing an entire multicast ring.

* * * * *